(12) United States Patent
Baudoin

(10) Patent No.: US 9,399,227 B2
(45) Date of Patent: Jul. 26, 2016

(54) REDUCED AIR HYDROCYCLONE UNIT AND FLUID SYSTEM AND METHOD

(71) Applicant: Michael Paul Baudoin, Lafayette, LA (US)

(72) Inventor: Michael Paul Baudoin, Lafayette, LA (US)

( * ) Notice: Subject to any disclaimer, the term of this patent is extended or adjusted under 35 U.S.C. 154(b) by 372 days.

(21) Appl. No.: 13/916,208

(22) Filed: Jun. 12, 2013

(65) Prior Publication Data

US 2014/0367346 A1   Dec. 18, 2014

(51) Int. Cl.
*B04C 9/00* (2006.01)
*B04C 5/28* (2006.01)
*E21B 21/06* (2006.01)
*B01D 21/24* (2006.01)
*B01D 21/26* (2006.01)
*B01D 21/02* (2006.01)

(52) U.S. Cl.
CPC ............. *B04C 9/00* (2013.01); *B01D 21/2494* (2013.01); *B01D 21/267* (2013.01); *B04C 5/28* (2013.01); *E21B 21/065* (2013.01); *B01D 21/02* (2013.01); *B01D 2221/04* (2013.01); *B04C 2009/005* (2013.01)

(58) Field of Classification Search
CPC ...... B04C 9/00; B04C 5/28; B04C 2009/005; E21B 21/065
See application file for complete search history.

(56) References Cited

U.S. PATENT DOCUMENTS

| | | | | |
|---|---|---|---|---|
| 4,090,523 A * | 5/1978 | Kelly, Jr. | ................. | E21B 21/08 210/512.2 |
| 4,634,535 A | 1/1987 | Lott | | |
| 5,221,476 A | 6/1993 | Papetti | | |
| 6,283,300 B1 | 9/2001 | Bielagus | | |
| 6,357,906 B1 | 3/2002 | Baudoin | | |
| 6,558,549 B2 | 5/2003 | Cote | | |
| 6,645,374 B2 | 11/2003 | Cote | | |
| 6,908,547 B2 | 6/2005 | Cote | | |
| 7,819,933 B2 * | 10/2010 | Moon | ................... | A47L 9/1625 55/459.1 |
| 2002/0020666 A1 | 2/2002 | Cote | | |
| 2003/0150798 A1 | 8/2003 | Cote | | |
| 2004/0079692 A1 | 4/2004 | Cote | | |

* cited by examiner

*Primary Examiner* — David A Reifsnyder
(74) *Attorney, Agent, or Firm* — Jones Walker LLP

(57) ABSTRACT

A reduced air hydrocyclone unit includes a hydrocyclone having a cylindrical section, a conical base having an underflow outlet formed in its apex, and an overflow outlet on an upper end of the cylindrical section. An underflow basin collects underflow material. Overflow material flows through an overflow line. An exhaust fan of the reduced air hydrocyclone unit withdraws from the overflow material in the overflow line a portion of an amount of air introduced through the apex of the hydrocyclone. A reduced air fluid system includes the reduced air hydrocyclone unit, a fluid tank in fluid communication with the overflow line of the reduced air hydrocyclone unit, and a reduced air hopper for mixing a solid material with a fluid contained in the fluid tank to form a slurry. A liquid barrier inlet of the reduced air hopper creates a liquid barrier to prevent air introduction into the slurry.

16 Claims, 3 Drawing Sheets

REDUCED AIR HYDROCYCLONE UNIT AND FLUID SYSTEM AND METHOD

BACKGROUND

Hydrocyclones are used to separate solid particles from liquids in suspensions based on density and coarseness (i.e., size). Hydrocyclones may also be used to separate two liquid phases having different densities. Typical hydrocyclones include a cylindrical section disposed above a conical base. The suspension or mixture is fed tangentially into the cylindrical section. The hydrocyclone has a small opening at the bottom apex of the conical base through which the underflow exits the hydrocyclone. The hydrocyclone also has a larger opening at the top of the cylindrical section through which the overflow exits. The underflow is generally the denser or coarser portion of the suspension or mixture, while the overflow is generally the lighter or finer portion.

Hydrocyclone units, such as desanders and desilters, are used to remove drill cuttings from drilling fluid. Because air is sucked through the opening at the apex of the conical section during use, air is introduced into the drilling fluid in the hydrocyclones. This entrained air adversely affects the quality of the drilling mud.

DETAILED DESCRIPTION OF THE PREFERRED EMBODIMENTS

A reduced air hydrocyclone unit includes an exhaust assembly to remove air introduced into an overflow material through an opening formed in an apex of hydrocyclones. The air is removed from the overflow material in an overflow line. The hydrocyclone may be a desander or a desilter.

Figure 1:
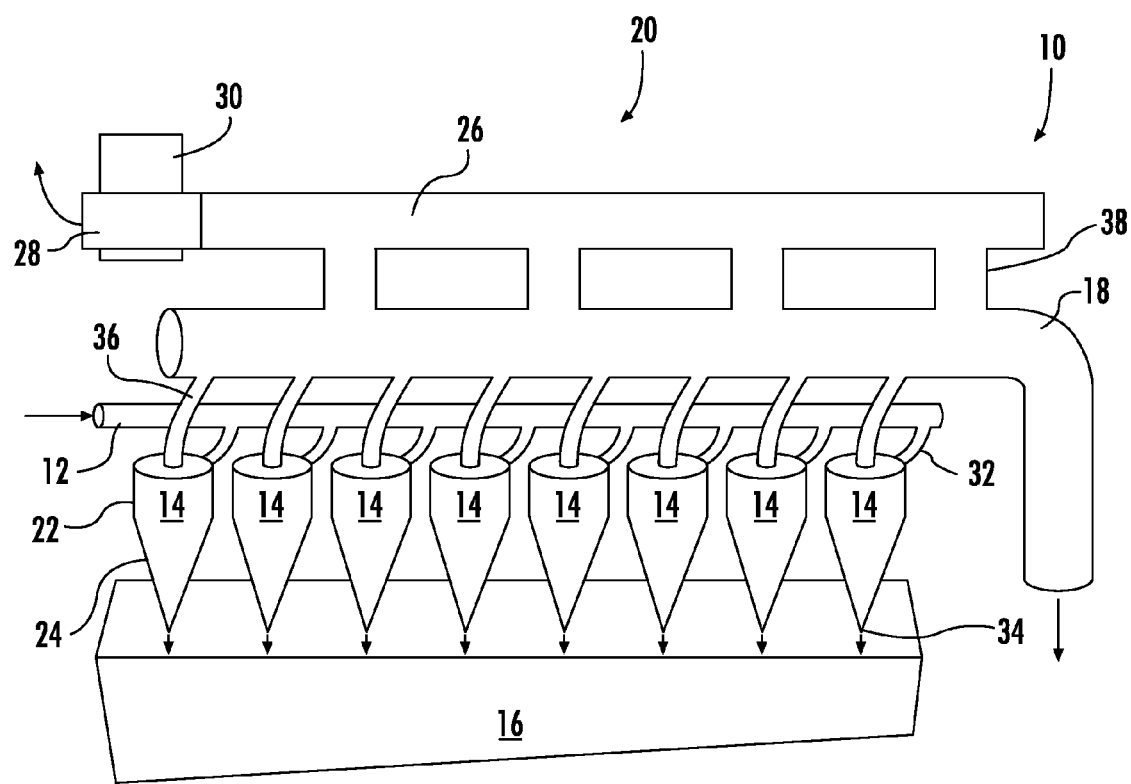
FIG. 1 is a schematic view of a reduced air hydrocyclone unit.

FIG. 1 shows reduced air hydrocyclone unit 10 having input line 12, hydrocyclone 14, underflow basin 16, overflow line 18, and exhaust assembly 20. Each hydrocyclone 14 may include cylindrical section 22 and conical base 24. Reduced air hydrocyclone unit 10 may include any number of hydrocyclones 14. For example, if reduced air hydrocyclone unit 10 is a desander, it may contain two or three of hydrocyclones 14. Each hydrocyclone 14 of a desander may have a diameter in the range of about 12 inches. Hydrocyclones 14 of a desander may remove solid particles having sizes in the range of 74-400 microns. Alternatively, if reduced air hydrocyclone unit 10 is a desilter, it may contain between ten and twelve of hydrocyclones 14. Each hydrocyclone 14 of a desilter may have a diameter in the range of about 4-5 inches. Hydrocyclones 14 of a desilter may remove solid particles having sizes in the range of 25-74 microns. Exhaust assembly 20 may include exhaust line 26, exhaust fan 28, and exhaust motor 30 for powering exhaust fan 28. Exhaust fan 28 and exhaust motor 30 may include any exhaust fan and motor combination known in the art to be capable of transferring air and/or gas out of exhaust line 26, such as those offered by Baldor.

A fluid may be fed into input line 12. The fluid may be diverted from input line 12 through input feeder lines 32 and into each hydrocyclone 14. Each hydrocyclone 14 may separate the fluid's heavier and coarser material from the lighter and finer material. The underflow material (i.e., the heavier and coarser material) may exit each hydrocyclone 14 through an underflow outlet opening formed in apex 34 and collect in underflow basin 16. The overflow material (i.e., the lighter and finer material) may exit each hydrocyclone 14 through overflow feeder lines 36 and into overflow line 18. Air may enter each hydrocyclone 14 through apex 34 and may exit with the overflow material. This air may rise within overflow line 18, along with any air and/or gas contained in the fluid fed into the input line 12. Exhaust fan 28 may be activated to create a slight vacuum in exhaust line 26 such that the air and gas in overflow line 18 may flow through exhaust connection lines 38 into exhaust line 26, and may exit through exhaust fan 28. The air and gas exiting exhaust fan 28 may be vented to the atmosphere. Alternatively, the air and gas exiting exhaust fan 28 may be routed to another location before being vented to the atmosphere. In another alternative, the air and gas exiting exhaust fan 28 may be cleaned before venting to the atmosphere.

The fluid fed into input line 12 may be drilling fluid returned from a wellbore during drilling operations such that the drilling fluid may contain solid particles (e.g., drill cuttings) that must be removed before circulating the drilling fluid into the wellbore again. A portion of the solid particles may be contained in the underflow that exits each hydrocyclone 14 through the underflow outlet opening in apex 34 and collects in underflow basin 16. The overflow exiting each hydrocyclone 14 through an overflow outlet opening leading to overflow feeder line 36 may be formed of drilling fluid containing less of the solid particles than the drilling fluid entering input line 12. A portion of any air introduced into the drilling fluid in each hydrocyclone 14 may be vented through exhaust connection lines 38, exhaust line 26, and exhaust fan 28. In this way, reduced air hydrocyclone unit 10 removes a portion of the solid particles from the drilling fluid while removing entrained air from the overflow drilling fluid before it exits overflow line 18. Reduced air hydrocyclone unit 10 may also remove air and/or gas contained in the drilling fluid fed into input line 12.

A reduced air fluid system may include at least one reduced air hydrocyclone unit 10, a drilling fluid tank, and a reduced air hopper. An exemplary reduced air hopper is described in U.S. Pat. No. 6,357,906 issued Mar. 19, 2002 (which is incorporated herein by reference).

Figure 2:
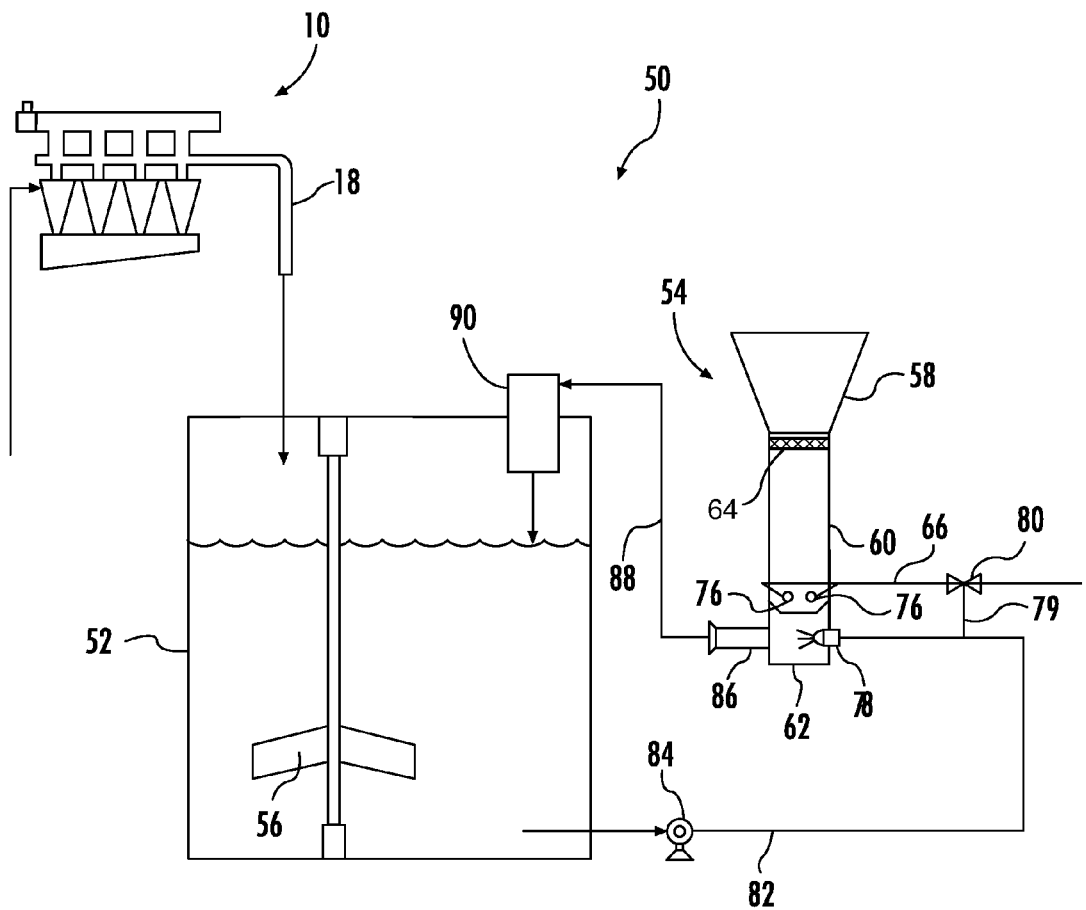
FIG. 2 is a schematic view of a reduced air fluid system including the reduced air hydrocyclone unit.

FIG. 2 shows reduced air fluid system 50 having reduced air hydrocyclone unit 10, drilling fluid tank 52, and reduced air hopper 54 disposed in drilling fluid tank 52. In an alternative embodiment, reduced air hopper 54 may be disposed outside of drilling fluid tank 52. Drilling fluid tank 52 may include agitator 56 to mix a drilling fluid contained in drilling fluid tank 52. Overflow material exiting overflow line 18 of reduced air hydrocyclone unit 10 may be fed into drilling fluid tank 52. Reduced air hopper 54 may include funnel 58 extending to throat section 60, which extends to mixing chamber 62. Reduced air hopper 54 may be used to mix a solid material fed into funnel 58 with the drilling fluid in drilling fluid tank 52. Screen 64 may be disposed within throat section 60 in order to collect large solid particles.

Reduced air hopper 54 may also include liquid barrier line 66 in fluid communication with liquid barrier inlet 76 that feeds into throat section 60. In one embodiment, reduced air hopper 54 may include two or more liquid barrier inlets 76. Liquid barrier inlet 76 may be arranged such that it directs a liquid in a downward fashion relative to the path of the solid material descending in throat 60. Liquid barrier inlet 76 may deliver a liquid into throat section 60 above mixing chamber 62 to provide enough volume to create a column of the fluid above jet nozzle 78 disposed in mixing chamber 62, thus preventing air from entering mixing chamber 62. Liquid barrier inlet 76 may be in fluid communication with liquid barrier line 79 that includes valve member 80. Opening valve member 80 may cause liquid barrier line 79 to communicate the drilling fluid from drilling fluid tank 52 into throat section 60.

Jet nozzle 78 may be fluidly connected to input line 82 and pump 84. The venturi effect may be used to mix the solid material and a second liquid fed through jet nozzle 78 in mixing chamber 62. In other words, as the second liquid exits jet nozzle 78 under a higher pressure, the solid material is mixed with the high pressure second liquid, and the resultant slurry within mixing chamber 62 (now at a higher pressure than the material in throat section 60) will seek an exit at the lower pressure of outlet 86. This venturi effect causes not only the mixing of the solid material with the second liquid into a slurry, but also aids in ejecting the slurry under pressure through outlet 86. The second liquid may be drilling fluid from drilling fluid tank 52.

The slurry exiting through outlet 86 may be fed through outlet line 88, diffuser 90, and into drilling fluid tank 52. Outlet line 88 may be formed of a tubular member having a diameter in the range of about 4 inches to about 6 inches. Diffuser 90 may be formed of a tubular member having a diameter in the range of about 8 inches to about 18 inches, and a length in the range of about 2 feet to about 5 feet. A lower end of diffuser 90 may be disposed above a level of the fluid contained in drilling fluid tank 52. Alternatively, the lower end of diffuser 90 may be disposed below the level of the fluid.

Figure 3:
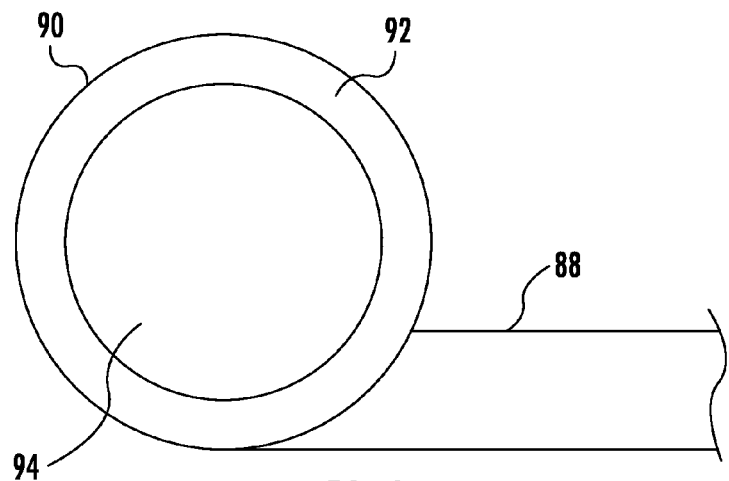
FIG. 3 is a top view of a diffuser of a reduced air hopper in the reduced air fluid system.

As shown in FIGS. 2 and 3, outlet line 88 may feed tangentially into diffuser 90 about 12 inches below an upper end of diffuser 90. Diffuser 90 may include end member 92 forming upper aperture 94. By feeding the slurry in outlet line 88 tangentially into diffuser 90 having a larger diameter than outlet line 88, the slurry's flow rate may be slowed as the slurry travels and is thinned along an inner surface of diffuser 90 facilitating the removal of air from the slurry and/or preventing additional air from entering the slurry upon discharge into drilling fluid tank 52. The air removed from the slurry in diffuser 90 may exit diffuser 90 through upper aperture 94. End member 92 may prevent the slurry from splashing out of diffuser 90. The fluid in drilling fluid tank 52 may be fed into a wellbore for use in drilling operations. "Fluid" as used herein may include, but is not limited to, mixtures, solutions, suspensions, and slurries.

Figure 4:
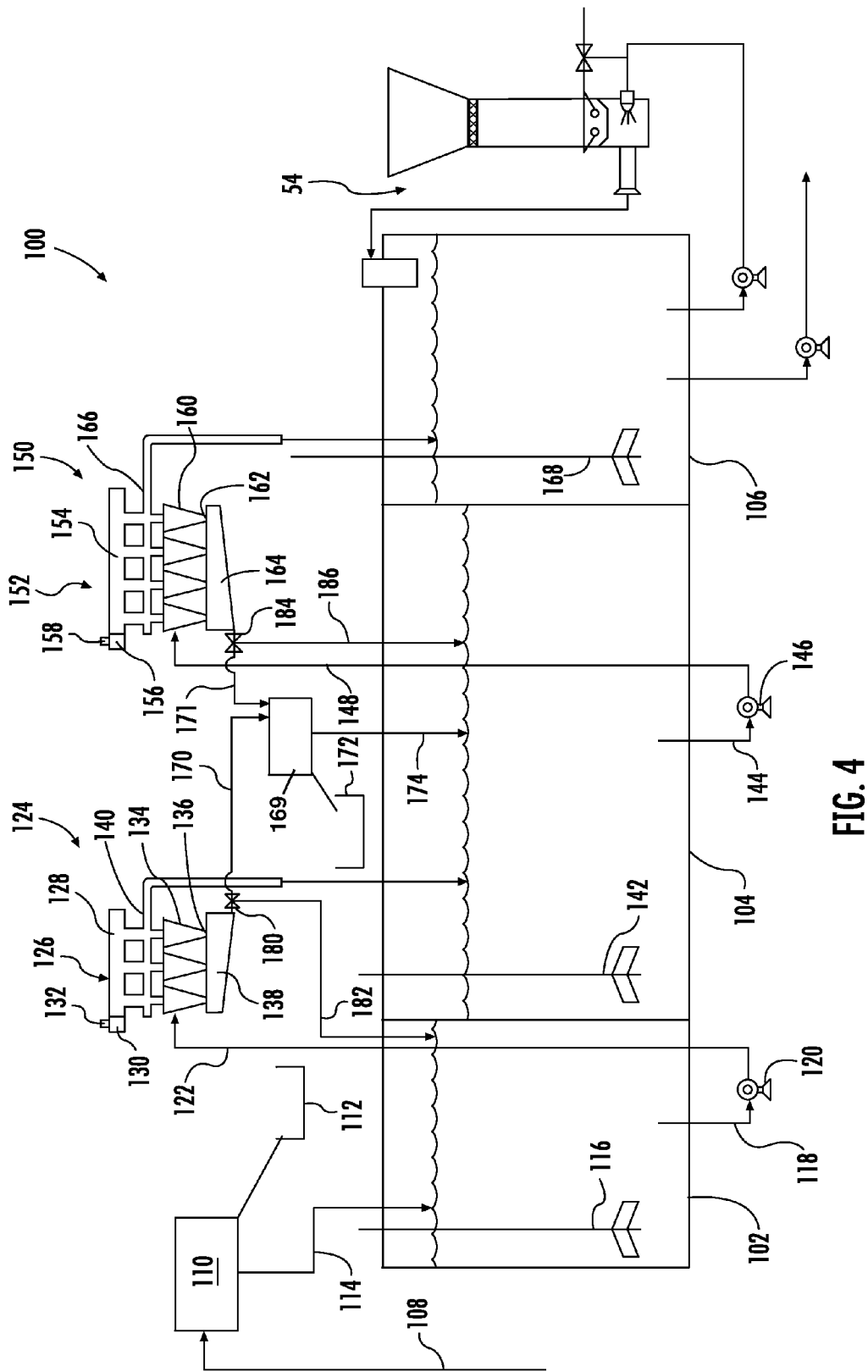
FIG. 4 is a schematic view of an alternative reduced air fluid system including the reduced air hydrocyclone unit.

FIG. 4 shows alternative reduced air fluid system 100 having first tank 102, second tank 104, and third tank 106. Drilling fluid returned from a wellbore may be fed through input line 108 and into shakers 110, which may separate large solids out of the drilling fluid. Shakers 110 may be one or more of any type of conventional shale shaker units having vibrating sieves or screens. The large solids separated by shakers 110 may be fed into solids tank 112. The remainder of the drilling fluid may be fed through fluid outlet 114 into first tank 102. First tank 102 may include first agitator 116 for mixing the drilling fluid to prevent clumping or gelling.

Drilling fluid may exit first tank 102 through first outlet line 118, which is in fluid communication with first pump 120 for feeding the drilling fluid from first tank 102 into desander input line 122. Desander input line 122 may feed the drilling fluid into desander 124, which may be designed according to reduced air hydrocyclone unit 10 of FIG. 1. Desander 124 may include exhaust assembly 126, including exhaust line 128, exhaust fan 130, and exhaust motor 132. Hydrocyclones 134 of desander 124 may separate a portion of the solid particles from the drilling fluid fed through desander input line 122. The underflow material exiting through an underflow outlet opening formed in apex 136 of each hydrocyclone 134 may collect in underflow basin 138. Exhaust assembly 126 may remove at least a portion of any air introduced through the underflow outlet opening in apex 136 of each hydrocyclone 134 from the drilling fluid overflow material in overflow line 140. The drilling fluid overflow material in overflow line 140 may be fed into second tank 104, which may include second agitator 142.

The drilling fluid may exit second tank 104 through second outlet line 144, which is in fluid communication with second pump 146 for feeding the drilling fluid from second tank 104 into desilter input line 148. Desilter input line 148 may feed the drilling fluid into desilter 150, which may also be designed according to reduced air hydrocyclone unit 10 of FIG. 1. Desilter 150 may include exhaust assembly 152, including exhaust line 154, exhaust fan 156, and exhaust motor 158. Hydrocyclones 160 of desilter 150 may separate a portion of the remaining solid particles from the drilling fluid fed through desilter input line 148. The underflow material exiting through an underflow outlet opening formed in apex 162 of each hydrocyclone 160 may collect in underflow basin 164. Exhaust assembly 152 may remove at least a portion of any air introduced through the underflow outlet opening in apex 162 of each hydrocyclone 160 from the drilling fluid overflow material in overflow line 166. The drilling fluid overflow material in overflow line 166 may be fed into third tank 106, which may include third agitator 168 and reduced air hopper 54. Alternatively, reduced air hopper 54 may be positioned outside of but in fluid communication with third tank 106.

The underflow material in underflow basin 138 of desander 124 and the underflow material in underflow basin 164 of desilter 150 may be fed into drying shakers 169 through underflow lines 170 and 171. Drying shakers 169 may remove at least a portion of any drilling fluid remaining in the underflow material. The "dried" underflow material may be fed into solids tank 172. The drilling fluid removed in drying shakers 169 may be fed through fluid outlet 174 and into second tank 104. Drying shakers 169 may be one or more of any type of conventional shale shaker units having vibrating sieves or screens.

While desander 124 and desilter 150 primarily function to remove solids from the material in first tank 102 and second tank 104, desander 124 and desilter 150 may remove air and/or a hydrocarbon gas from the material in first tank 102 and second tank 104 in addition to removing the air introduced through the openings in apex 136 of each hydrocyclone 134 and the openings in apex 162 of each hydrocyclone 160. For example, a degasser may be used to remove a hydrocarbon gas from the material in first tank 102, but the degasser may not remove all of the hydrocarbon gas in the material. Accordingly, desander 124 and desilter 150 may further remove air and the hydrocarbon gas not removed by the degasser.

In one embodiment, desander 124 may be used to remove air or hydrocarbon gas from the material in first tank 102 without using the degasser. The material may be pumped from first tank 102 through desander input line 122 and into desander 124. Exhaust assembly 126 may remove air and/or hydrocarbon gas from the material in desander 124. Valve 180 may be adjusted in order to allow the underflow material collected in underflow basin 138 to be returned to first tank 102 through return line 182, instead of being directed to drying shakers 169. Similarly, desilter 150 may be used to remove air or hydrocarbon gas from the material in second tank 104 without using the degasser in first tank 102. The material may be pumped from second tank 104 through desilter input line 148 and into desilter 150. Exhaust assembly 152 may remove air and/or hydrocarbon gas from the material in desilter 150. Valve 184 may be adjusted in order to allow the underflow material collected in underflow basin 164 to be returned to second tank 104 through return line 186, instead of being directed to drying shakers 169.

Reduced air hopper 54 may be used to add solid material to the drilling fluid in third tank 106 as described above. Drilling fluid from third tank 106 may exit through third outlet line 176, which is in fluid communication with third pump 178. The drilling fluid in third outlet line 176 may be used for feeding the drilling fluid from third tank 106 back into the wellbore.

While preferred embodiments of the present invention have been described, it is to be understood that the embodiments are illustrative only and that the scope of the invention is to be defined solely by the appended claims when accorded a full range of equivalents, many variations and modifications naturally occurring to those skilled in the art from a review hereof.

The invention claimed is:

1. A reduced air hydrocyclone unit comprising:
   a hydrocyclone in fluid communication with an input line through an input feeder line, the hydrocyclone comprising a cylindrical section disposed above a conical base, wherein an apex of the conical base forms an underflow outlet, and wherein an overflow feeder line extends from an overflow outlet disposed on an upper end of the cylindrical section;
   an underflow basin disposed below the hydrocyclone for collecting any underflow material flowing through the underflow outlet;
   an overflow line in fluid communication with the overflow feeder line for allowing any overflow material flowing through the overflow outlet to exit the reduced air hydrocyclone unit through an overflow line outlet disposed at an end of the overflow line, wherein the overflow line is configured to accommodate an overflow material including a liquid; and
   an exhaust assembly in fluid communication with the overflow line for removing air introduced into the overflow material through the underflow outlet of the hydrocyclone, the exhaust assembly including an exhaust line fluidly connected to the overflow line at a point between the overflow feeder line and the overflow line outlet, wherein the exhaust line includes an outlet end configured to allow the removed air to exit the reduced air hydrocyclone unit therethrough, and wherein the exhaust assembly further includes an exhaust fan disposed at the outlet end of the exhaust line and an exhaust motor configured for powering the exhaust fan.

2. The reduced air hydrocyclone unit of claim 1, comprising two hydrocyclones.

3. The reduced air hydrocyclone unit of claim 1, comprising ten hydrocyclones.

4. The reduced air hydrocyclone unit of claim 1, wherein the exhaust assembly further comprises an exhaust connection line in fluid communication between the overflow line and the exhaust line.

5. A reduced air fluid system comprising:
   a reduced air hydrocyclone unit comprising:
      a hydrocyclone in fluid communication with an input line through an input feeder line, the hydrocyclone comprising a cylindrical section disposed above a conical base, wherein an apex of the conical base forms an underflow outlet, and wherein an overflow feeder line extends from an overflow outlet disposed on an upper end of the cylindrical section;
      an underflow basin disposed below the hydrocyclone for collecting any underflow material flowing through the underflow outlet;
      an overflow line in fluid communication with the overflow feeder line for allowing any overflow material flowing through the overflow outlet to exit the reduced air hydrocyclone unit; and
      an exhaust assembly in fluid communication with the overflow line for removing air introduced into the overflow material through the underflow outlet of the hydrocyclone, wherein the exhaust assembly comprises an exhaust fan disposed at an end of an exhaust line that is in fluid communication with the overflow line;
   a fluid tank in fluid communication with the overflow line of the reduced air hydrocyclone unit, the fluid tank containing a fluid and dimensioned to collect and store the overflow material;
   a reduced air hopper in fluid communication with the fluid tank for mixing a solid material with the fluid contained in the fluid tank, the reduced air hopper comprising:
      a funnel adapted to receive the solid material;
      a throat section in communication with and extending from a lower end of the funnel, the throat section adapted to receive the solid material;
      a liquid barrier inlet disposed in a lower end of the throat section to deliver a first liquid into the throat section;
      a mixing chamber in communication with and extending from the lower end of the throat section, the mixing chamber adapted to receive the solid material and the first liquid;
      a jet nozzle disposed in the mixing chamber to deliver a second liquid into the mixing chamber for mixing with the solid material to form a slurry, the jet nozzle being connected to a pump for delivering the second liquid under a pressure force; and
      an outlet in fluid communication with the mixing chamber and the fluid tank for withdrawing the slurry from the mixing chamber and into the fluid tank.

6. The reduced air fluid system of claim 5, wherein the second liquid is the fluid contained in the fluid tank.

7. The reduced air fluid system of claim 5, wherein the first liquid and the second liquid are comprised of the same material.

8. The reduced air fluid system of claim 5, wherein the first liquid and the second liquid are comprised of the fluid contained in the fluid tank.

9. The reduced air fluid system of claim 5, further comprising an underflow line in fluid communication with the underflow basin and a drying shaker, the drying shaker adapted to remove liquid components from solid components in the underflow material collected in the underflow basin of the reduced air hydrocyclone unit.

10. The reduced air fluid system of claim 9, further comprising a valve on the underflow line and a return line in fluid communication with the valve and the fluid tank for selectively returning the underflow material flowing through the underflow line to the fluid tank.

11. The reduced air fluid system of claim 5, further comprising an agitator disposed in the fluid tank for mixing the fluid contained in the fluid tank.

12. The reduced air fluid system of claim 5, wherein the outlet of the reduced air hopper includes an outlet line extending from the mixing chamber to a diffuser that is in fluid communication with the outlet line and the fluid tank, wherein the diffuser comprises a tubular member adapted to reduce a flow rate of a fluid fed into the diffuser from the outlet line, the tubular member having an aperture in its upper end for allowing air to exit the diffuser, and wherein the outlet line is tangentially connected to the tubular member of the diffuser.

13. The reduced air fluid system of claim 5, wherein the reduced air hydrocyclone unit comprises two hydrocyclones.

14. The reduced air fluid system of claim 5, wherein the reduced air hydrocyclone unit comprises ten hydrocyclones.

15. A reduced air fluid system comprising:

a reduced air hydrocyclone unit comprising:
- a hydrocyclone in fluid communication with an input line through an input feeder line, the hydrocyclone comprising a cylindrical section disposed above a conical base, wherein an apex of the conical base forms an underflow outlet, and wherein an overflow feeder line extends from an overflow outlet disposed on an upper end of the cylindrical section;
- an underflow basin disposed below the hydrocyclone for collecting any underflow material flowing through the underflow outlet;
- an overflow line in fluid communication with the overflow feeder line for allowing any overflow material flowing through the overflow outlet to exit the reduced air hydrocyclone unit; and
- an exhaust assembly in fluid communication with the overflow line for removing air introduced into the overflow material through the underflow outlet of the hydrocyclone, wherein the exhaust assembly comprises an exhaust fan disposed at an end of an exhaust line that is in fluid communication with the overflow line and an exhaust motor configured for powering the exhaust fan; and a fluid tank in fluid communication with the overflow line of the reduced air hydrocyclone unit, the fluid tank containing a fluid and dimensioned to collect and store the overflow material.

16. The reduced air fluid system of claim 15, wherein the overflow line and the fluid tank are each configured to accommodate an overflow material including a liquid.

* * * * *